United States Patent [19]

Middendorf et al.

[11] 3,920,853

[45] Nov. 18, 1975

[54] PROTEIN FOOD PRODUCT

[75] Inventors: John Edward Middendorf, Affton; Doyle Hans Waggle, St. Louis, both of Mo.; Alan Cornell, Bloomfield, Conn.

[73] Assignee: Ralston Purina Company, St. Louis, Mo.

[22] Filed: Nov. 14, 1973

[21] Appl. No.: 415,921

Related U.S. Application Data

[63] Continuation of Ser. No. 124,739, March 16, 1971, abandoned.

[52] U.S. Cl. ............... 426/104; 426/506; 426/512; 426/520; 426/524; 426/574; 426/656; 426/657; 426/802
[51] Int. Cl.² .......................................... A23J 3/00
[58] Field of Search ........... 426/104, 506, 507, 364, 426/205, 512, 520, 524, 574, 656, 657, 802

[56] References Cited
UNITED STATES PATENTS

| | | | |
|---|---|---|---|
| 3,047,395 | 7/1962 | Rusoff et al. | 426/506 X |
| 3,488,770 | 1/1970 | Atkinson | 426/506 X |
| 3,490,914 | 1/1970 | Okumura et al. | 426/364 |
| 3,645,747 | 2/1972 | Palmer | 426/364 |
| 3,662,671 | 5/1972 | Frederiksen et al. | 426/205 |
| 3,662,672 | 5/1972 | Hoer | 426/205 |
| 3,684,522 | 8/1972 | Anker et al. | 99/17 |
| 3,814,823 | 6/1974 | Yang et al. | 426/506 X |

*Primary Examiner*—James R. Hoffman
*Attorney, Agent, or Firm*—Virgil B. Hill

[57] ABSTRACT

A structured food product is made by specially processing an aqueous slurry of animal and/or vegetable protein material. The slurry is prepared by finely comminuting vegetable protein material, e.g. from soybeans or animal protein materials, e.g. from meat by-products or the like, and then dispersing them in water to form an aqueous, protein solution-suspension. The slurry is first controllably frozen into thin ice crystal layers spaced by intermediate thin crystalline-molded protein layers. All of these layers extend in a direction generally normal to the refrigerating surface or to the surface portion of the slurry in engagement with the refrigerating medium, making them generally unidirectional in their zone of the product. After the slurry-suspension freezes, water is segregated into ice crystal layers and forces the proteinaceous material ahead of the freezing zone and compresses the protein particles into adjacent generally parallel coherent layers in each zone. Steps are then taken to remove the ice crystal layers and also cause fragile compressed protein layers to be quickly and irreversibly set or fixed. This is preferably done by heating the complex of zonal, unidirectional protein layers to an elevated temperature above about 150° F., and doing so rapidly enough to first melt the ice crystal matrix and then irreversibly fixing or setting these protein layers into a striated protein product. A structured protein food product is also disclosed having striated protein layers resembling cooked muscle tissue with lines of cleavage generally arranged in the same direction, at least in local zones. The layers are crystalline-molded, irreversibly set, and derived from integrally cooperative, minute protein particles.

26 Claims, 5 Drawing Figures

INVENTORS
 ALAN CORNELL
 JOHN E. MIDDENDORF
 DOYLE H. WAGGLE
BY *Virgil B. Hill*

INVENTORS
ALAN CORNELL
JOHN E. MIDDENDORF
DOYLE H. WAGGLE
BY
*Virgil B. Hill*

PROTEIN FOOD PRODUCT

This is a continuation of application Ser. No. 124,739, filed on Mar. 16, 1971 now abandoned.

BACKGROUND OF THE INVENTION

This invention relates to food products and more particularly to structured protein food products made from particulate vegetable and/or animal protein substances.

Beginning with highly nutritious and inexpensive, but generally less desirable, food materials, and processing such to result in highly desired food products, has been the goal of extensive research efforts by several organizations and individuals for decades. Particular efforts have been directed toward production of simulated meat products, from vegetable and/or animal protein substances. Various degrees of success have been reached by a variety of processes, as is illustrated for example, by U.S. Pat. No. 2,682,466 to Boyer involving spun filaments, and U.S. Pat. No. 3,496,858 to Jenkins involving elevated temperature and pressure extrusion.

As is well known, the actual chemistry and physics of food substances is so complex that, in spite of extensive efforts, only a relatively small amount of knowledge has been gained about the actual scientific basis for observed phenomena. Consequently, many of the major breakthrough discoveries in this field are accidental. In spite of such notable past discoveries, however, there has been a continuing need for an economical, readily adapted process for converting either vegetable or animal protein materials, or mixtures thereof, to improved meat simulating products of various types.

SUMMARY OF THE INVENTION

This invention is the result of a unique, new protein food structuring discovery that causes vegetable and/or animal protein to be convertible to high demand food products.

The conversion can be inexpensively achieved with a combination of simple refrigerating and heating equipment. The new process results in food products bearing such a close resemblance to high demand food products, especially quality meat, that the difference usually cannot be detected. Furthermore, vegetable proteins such as soybeans can be converted to high demand food products such as simulated meat easily, quickly, and at a low cost. Likewise, low grade meat substances can be likewise converted to high quality choice pieces of meat.

The novel process, once understood, is actually very simple to perform. Indeed, its simplicity is one of its major attributes.

The method involves the steps of engaging at least part of the surface area of an aqueous slurry of protein material with a refrigerating medium and controllably freezing the slurry into segregated ice crystal layers spaced by intermediate crystalline-molded layers of slurried protein particles, while causing all of these layers to extend in a common, generally normalized, direction to the refrigerated surface area. Then, with the ice layers cumulatively comprising an in situ forma matrix which spaces, molds, and compresses the protein layers, the next crucial process step is to remove the ice layers and irreversibly fix the remaining fragile protein layers into a striated arrangement which can resemble actual muscle tissue. The protein layers thus have lines of cleavage generally arranged in the same direction, at least in local zones.

The selected number and arrangement of local zones, each zone with its own protein layers of common direction, may be varied to match the standard of the specific type of foodstuff involved, to include red meat, poultry, fish and other sea foods.

These and additional objects, advantages, and details of the invention are set forth in the following description.

DESCRIPTION OF THE PREFERRED EMBODIMENTS

Figure 1:
FIG. 1 is a photographic reproduction of a simulated meat product prepared from soy protein according to the discovery herein and showing a series of striated protein layers with generally normalized lines of cleavage between said layers.

This inventive discovery relates to both a novel method of preparing desirable, structured protein food products, and to specific striated, structured protein food products.

The novel food product of the present invention bears a tremendously close resemblance to highly desired foodstuffs, especially meat, as a result of its arrangement of striated protein layers. These layers have lines of cleavage generally arranged in the same direction, at least in local zones. The layers of the final product closely overlie each other in adjacent fashion, without significant voids between them. They are crystalline-molded, i.e. shaped or molded in protein layers initially spaced by intermediate crystalline layers of ice segregated from the protein. The ice layers that segregate from the protein particles during crystal formation, create in situ a molding matrix ror the protein. The forming ice layers expand to compress the protein into layers. These ice layers must also be removed, but when this is done, care must be taken to assuredly fix or set the temporarily self-supporting protein layers without disrupting the stria. Heating to a temperature above about 150° F. achieves this.

As far as is known, no one previously has been able to obtain this unique food product, and so readily, from vegetable and/or animal proteins. This is so even though at least one party, as set forth in U.S. Pat. No. 3,490,914 came close to discovering the novel process, but instead obtained a spongy mass. Furthermore, neither did this party irreversibly fix the protein material by his teachings therein. Therefore, according to the present invention, a striated, layered food product resembling cooked muscle tissue is obtained by the directionally controlled, crystalline molding of protein layers, following irreversible fixation thereof.

This invention may be practiced with either a vegetable or animal protein as a starting material or a combination thereof. The particular protein starting material should be capable of being "heat set" or irreversibly fixed, as set forth in the present invention, e.g. heating to a temperature above 150° F. while the ice layers serve as a mold for the protein to convert the protein to a firm, irreversible, substantially insoluble form. Whether a particular protein source is capable of being heat set within the scope of the present invention may be readily determined by one skilled in the art employing the process set out herein.

An animal protein material, for example, may be used as the starting material and may include generally various types of animal protein sources, i.e. red meat, fowl, fish, and other sea foods. One of the most significant advantages of the present invention is that a particular protein source is not critical to its practice. Rather, any type of heat settable protein material, e.g. natural meat or secondary protein source material, including those which are considered to be of a less desirable quality and not as desirable for human consumption may be employed. This allows the use of economical meat by-products to produce the striated, protein food product of the present invention which in texture resembles closely, various highly desired foodstuffs to include preferred meat types. If an animal protein source is employed, it can be used in its native form without additional processing other than removal of bones or other inedible portions of the protein source.

In utilizing the protein source in the present process, it is first reduced to particulate form in a suitable grinder or food chopper. An exact degree of grinding is unnecessary, although generally it is that which is necessary to masticate or grind the protein source to a paste of uniform consistency, so that it may be easily slurried prior to processing. Various natural meat or animal protein sources such as chicken, or other types of fowl, chicken by-products, pork, pork by-products, beef products, such as beef muscle, beef trimmings, beef liver, beef by-products, fish muscle, or fish trimmings may be selectively combined or used singularly depending on the desired flavor of the product produced.

One of the most revolutionary concepts of the present invention is that various secondary protein sources, including the more economical vegetable proteins may be employed as the sole protein source in the present invention to produce foodstuffs such as meat surrogate products, or alternately may be combined with animal protein materials having their natural flavor components to yield even more economical food products, which still resemble highly desired meat types in texture, but eliminate the need for a flavoring system, as is required when a bland protein source is employed.

Such secondary protein sources may be typically selected from a very broad class of proteinaceous materials capable of being heat set. These include vegetable protein, petro-protein, microbial protein and various secondary protein materials derived from natural meat processing operations, i.e. meat meal, poultry meal, fish meal, and/or various concentrates made therefrom. The vegetable proteins, particularly the oilseeds, such as soybeans, are among the most usable in the present invention since they are both economical and readily available as a protein source. As to the use of secondary protein sources, it is preferable to first place the source in a purified as well as a hydrated form. This can most conveniently be accomplished by precipitation of the protein from a slurry of the secondary protein source. This yields the curd or damp viscous mass form of the protein which may be conveniently utilized as the protein source. Although the following will describe generally the processing of soybeans to yield the hydrated curd, it should be understood that with slight variations involving the isoelectric point of the proteins, the technique can generally be applied to any secondary portein source. protein should also be recognized that the curd or hydrated form of protein can be dried and then also rehydrated without seriously affecting its usefulness as a protein source.

To obtain a protein concentrate or an isolate from a secondary protein source, it is necessary to separate the protein from the non-proteinaceous materials with which it is associated in the source. When producing a protein isolate from an oilseed such as soybeans, for example a chemical precipitation and separation is usually employed. Typically, whole soybeans are crushed or ground in convenient fashion and passed through a conventional oil expeller. However, the oil is preferably removed by solvent extraction, using various hydrocarbon type solvents normally employed for this purpose.

The resulting solids, commonly referred to as soybean meal, and normally in the form of flakes, contain many ingredients including complex proteins, sugars, fibers and others. The proteins and sugars are then preferably dissolved out of the solids. This may be done by adding the flakes to an aqueous bath and adding a food grade alkaline material to raise the pH substantially above 7. Typical of such alkaline reagents is sodium hydroxide, potassium hydroxide, calcium hydroxide or other commonly accepted food grade alkaline reagents. The material is then extracted for a period of time sufficient to put the proteins and sugars in solution, usually about 30 minutes or so. The resulting liquor solution is separated from the solids, as by passing the material through a screen and/or centrifuging. Preferably, the liquor is then cycled through a clarifier to remove tiny particles.

The soy proteins are then precipitated from the liquor by lowering the pH to an acidic value of the isoelectric point of the protein, usually pH of 4.6 to 4.9, with the addition of a common food grade acidic reagent such as acetic acid, phosphoric acid, citric acid, tartaric acid or others. The precipitate is then separated as by centrifuging and washed with water to remove remaining sugars, except for a minute trace which is particularly impossible to remove. The precipitated curd is a viscous aqueous slurry having a solids content of 10 to 40 percent by weight, preferably about 20 percent containing between about 90 and 98 percent by weight protein on a solids basis and between about 60 and 90 percent by weight water.

The selected protein starting material is initially made into an aqueous slurry by slurrying of the protein material which may be carried out by homogenization or blending. The aqueous slurry of protein material will be formulated to allow for the addition of a sufficient amount of the protein material, or the addition of water or other ingredients, to adjust the solids content in the slurry to a level above at least about 5 percent by weight, but preferably between about 15 and 30 percent by weight of the slurry. The addition of protein starting material to achieve the prescribed solids level will also be such that the slurry will have a protein content above at least about 5 percent by weight, but preferably between about 15 and 30 percent by weight.

Prior to formation of the slurry, various other ingredients will be formulated for addition to the mixture to contribute to the flavor and taste of the food product produced thereby. For example, various smoke or charcoal flavorings, herbs or spices as contribute to the flavor of the product may be added to the mixture at this stage.

There may also be added to the slurry at this stage other ingredients which have been found to additionally contribute textural the tectural characteristics of the striated food product of the present invention, besides just contributing to and improving the flavor and taste of the food product. Salt, for example, is such an ingredient and is a necessary ingredient for the seasoning and flavoring of a natural meat material. Accordingly, the addition of various salts such as sodium chloride, calcium chloride, or trisodium phosphate improves the flavor and taste characteristics of the product although if above about 3 percent by weight is added to the mixture in the present process a very salty tast is attained. It has also been determined, however, that if above about 3 percent by weight of salt is added to the slurry, not only is the taste of the product too salty, but furthermore, in some instances when the protein starting material is contacted with a refrigerating medium to form segregated ice crystal layers with intermediate layers of protein particles, followed by irreversible fixing of these protein layers, a gel-like or rubbery texture is obtained. This result is in contrast to the product having layers of protein material with local zonal, lines of cleavage generally arranged in the same direction, which is obtained when lesser amounts of salt are employed.

In general, it is preferable that the pH of the proteinaceous slurry be within the range of 4 to 6 to obtain optimum results. However, the process will produce an acceptable product over a very wide and non critical pH range. The discovery of the pH range which produces the improved optimum effect is the result of work of other inventors and is not claimed herein as part of applicants' invention.

The aqueous slurry of the protein material as formulated will then be slurried prior to engagement of the slurry with a refrigerating medium. Such slurrying will generally comprise griding, blending, comminuting or homogenizing of the aqueous slurry of the protein material to in general reduce the protein starting material into small particles. This also promotes uniform mixing with other ingredients added to the slurry at this stage. Although the exact degree of grinding, comminuting or homogenizing treatment is not critical to the practice of the present invention or the production of the novel striated food product thereby, the treatment stop of grinding or homogenizing may be carried out in various equipment such as a Versator, colloid mill or high speed blending equipment as will produce a uniform and consistent slurry of the protein starting material. In general, the slurry will be uniform and the protein reduced to a small enough particle size that it will resemble a uniform emulsion, for example, if a high percentage of water insoluble material such as fats and oils are employed. Providing for the production of a consistent and uniform slurry promotes the formation of a highly uniform and consistent food product by the present process.

After treatment of the aqueous slurry by homogenization, or other suitable treatment means, the slurry is preferably deaerated by using a vacuum or a piece of equipment such as a Versator which is equipped to perform such a function during homogenization. While deaeration is not critical to the practice of the novel process, nevertheless it is preferable in promoting consistency and uniformity of the striated food product of the present invention. The presence of air in the slurry after contact with the refrigerating medium and heat setting thereof will create voids which will detract from the striated layers of protein with lines of cleavage in local zones so as to interrupt these lines of cleavage. Deaeration therefore results in production of striated protein layers with uninterrupted and continuous lines of cleavage, and is preferable in the practice of the present invention.

The slurry of the proteinaceous starting material is then controllably frozen. The freezing, as has been noted, creates a remarkable structuring effect on the protein by forming spaced, thin, ice crystal layers in the suspension or slurry of the protein starting material, which in turn act as crystalline molds to compress the protein particles in the slurry into adjacent, generally coherent layers. The layers are therefore also generally parallel, at least in local zones. This freezing effect results in the ice layers which segregate from the protein particles in the slurry during freezing, and because of ice crystal formation, create in situ, a crystalline molding matrix for the protein material. These ice layers during formation in turn expand and thereby compress the protein into adjacent layers with the ice crystal layers being interspersed between them. It may be noted that the ice layers therefore crystalline mold the protein particles to form protein layers generally similar to the myofibrillar bundles of muscle fibers normally found in the muscle tissue of choice cuts of meat.

During this freezing step, the proteinaceous slurry is contacted or engaged with a refrigerating medium and controllably subjected to heat exchange and frozen so as to form ice crystal layers in a direction generally normal to the regrigerating surface or to the surface portion of the slurry in engagement with the refrigerating medium. This makes the ice crystal layers generally unidirectional, at least in their zone of the product. It is, of course, the alignment of these ice crystal layers in a direction generally normal to the refrigerating surface that causes the molding of the generally parallel and coherent protein layers by the ice crystal matrix.

Controlled freezing is carried out by a controlled, directional heat exchange, and as a preferred embodiment, a combination of directional heat exchange and a controlled freezing rate to achieve formation of the ice crystal layers which in turn mold the protein into layers. For example, if the slurry is placed in a predetermined configuration such as a mold of nearly any shape, e.g. a rectangle, a rectangular prism or a hemispherical container, and then contacted with a refrigerating surface or medium on at least one side, ice crystal layers are formed in a direction generally normal to the refrigerating surface or to the surface portion of the slurry in engagement with the refrigerating medium. The remaining sides of the container may be insulated if desired to minimize heat exchange at these surfaces and prevent layer formation in directions normal to these surfaces. Alternately, they may remain uninsulated depending on the specific texture of the food product desired.

As a preferred embodiment, a particular freezing rate has also been found to result in good formation of ice crystal layers which, in turn are capable of crystalline molding and compressing the protein into generally coherent layers. It has been found, however, that any freezing rate may be in general employed to structure the protein. This includes very rapid freezing or almost instantaneous freezing as, for example, would be obtained by dipping or submerging the material in liquid nitrogen. However, for the production of food products which resemble a more coarse type of muscle tissue, a somewhat slower freezing rate is preferred since this tends to enhance formation of larger crystal layers and hence produce larger striations. A rapid freezing rate would result in the growth of smaller and finer ice crystal layers as opposed to large ice crystal layer growth, which crystalline molds the protein into a structure with larger striations. Of course, if a different structure, which is much finer, and with smaller, more uniform striations is desired, then a very rapid freezing rate may be employed. A selection may be made between a very rapid or slower freezing rate which is dependent on the texture of the foodstuff being produced. Furthermore, rapid freezing has the obvious commercial advantage of increasing productive capacity as opposed to a slower freezing technique.

A specific freezing rate which is suitable to produce a crystalline molding effect on the protein particles and hence, upon cooking, the striated food product of the present invention is for the slurry temperature to be reduced and pass through the freezing point range of the slurry in at least about 5 minutes. The freezing point range of the slurry will normally be the temperature range of between about 32° – 27° F. as measured at any point in that slurry. This freezing rate results in good formation of the ice crystal layers, which crystalline mold the protein particles into striated, generally coherent layers.

It should be recognized that the temperature range referred to is that of the slurry temperature as opposed to the refrigerating medium temperature since the refrigerating medium may be of any temperature as long as the temperature of the protein slurry is reduced at the desired freezing rate. The use of this particular freezing rate, while it is not intended to be limiting as the only freezing rate suitable for production of the novel food product of the present invention, results in good ice crystal layer formation and hence formation of the ice layers in a direction generally normal to the refrigerating surface or to the surface portion of the slurry in engagement with the refrigerating medium. The formation of these layers, crystalline-molds the protein into discrete, generally coherent layers, these lalyers also being generally normal to the refrigerating surface and when the ice is removed and the protein layers irreversibly set, a striated food product is produced which can have such a close resemblance to actual quality meat that the difference usually cannot be detected.

After controlled freezing of the proteinaceous slurry to form segregated ice crystal layers, spaced by intermediate crystalline molded layers of protein, in a generally normalized direction, the ice layers at this point cumulatively comprise a matrix or mold which spaces and compresses the protein layers. Therefore, the protein layers must be irreversibly fixed after crystalline molding thereof to result in a striated arrangement of the protein layers. This irreversible fixation may be carried out by raising the temperature of the frozen proteinaceous slurry to a temperature above about 150° F. but preferably above about 180°F. When the proteinaceous slurry is raised to above this temperature, the ice crystal layers are melted during the temperature rise of the slurry and as the slurry temperature is raised above about 150°F., preferably above about 180°F., irreversible fixation of the protein layers occurs. This results in a striated arrangement of these layers which provides a product remarkably resembling the cooked muscle tissue of high quality meat.

Heating of the product to carry out irreversible fixation of the protein layers may be carried out in nearly any heating device and at nearly any temperature so long as the temperature in the proteinaceous body achieves the prescribed level. The temperature of the surrounding environment or heating chamber employed however, should not be so high as to scorch or burn the proteinaceous mass. A convenient means and a specific embodiment of carrying out the heating step therefore is to use a steam chamber fed by live steam and to maintain the chamber temperature at at least about 212° F.

The heating step of irreversible fixation of the protein layers must be carried out at a rapid enough rate to achieve a temperature of at least about 150°F., but preferably above about 180° F., in the mass within a period of time of between about 5 minutes and several hours with the exact rate being dependent on the size of the material. Heating at this rate insures fixation of the temporarily self-supporting protein layers without disruption thereof. During this heating step as irreversible fixation of the protein layers occurs, no appreciable degree of support is needed for the protein layers to prevent disruption thereof if heating is carried out at the aforementioned rate. In other words, the frozen proteinaceous mass may be removed from the mold or container and heated by itself or it may also be preferably kept in its mold or container which provides some degree of support during irreversible fixation of the protein layers. In the latter case, the rate of heating becomes not as important as long as irreversible fixation of the protein layers occurs.

Thus, the degree of support for the protein layers during the heating step is generally not critical to the formation of the striated food product of the present invention. It is, however, preferred to provide some degree of support for the proteinaceous mass during the heating step as opposed to removal from the mold or container in which it is frozen to prevent sagging or disruption of the layers. This is true especially if a large mass is involved or if the temperature of the mass is slowly raised rather than rapidly raised. This preferred degree of support may range from simply wrapping the frozen proteinaceous body in foil to retaining it in its mold or container employed during the freezing process while heating of the mass to the prescribed temperature is carried out.

After irreversible fixation of the protein layers, a striated food product is produced and which resembles cooked muscle tissue to such a degree that the difference between it and cooked muscle tissue derived from high quality cuts of meat cannot usually be detected. The food product may be observed as having in general, lines of cleavage between the fixed protein layers, these lines of cleavage being generally arranged in the same direction, at least in local zones. It will also be observed that the structural units of protein with lines of cleavage interposed between is remarkably similar to the arrangement of the structural units of protein as found in cooked muscle tissue. When the striated food product is cut with a knife or chewed, it has the tenderness and masticatory properties of a choice piece of meat. For example, when the protein source is beef or red meat as derived from a lower grade or red piece of meat such as a chuck roast, the striated food product which is produced therefrom resembles a sirloin tip or high quality of beef which is both tender and appealing in taste and flavor. Likewise, when all of the edible portions derived from fowl such as turkey or chicken are used as the protein source in the present invention, and even with the white and dark portions of meat being mixed together, the striated food product produced thereby resembles closely the breast meat of the fowl, being of remarkable tenderness, light in color and with a taste resembling that of turkey or chicken.

The following examples will generally serve to be illustrative rather than limitative of my invention, since it should be understood that numerous other examples could be given to illustrate the novel characteristics of the present product and process therefor.

EXAMPLE 1

Figure 2:
FIG. 2 is a photographic reproduction of a simulated meat product prepared from soy protein according to this discovery and formed in a hemispherical container.

Cleaned, dehulled soybeans were ground and the oil extracted with hexane to give defatted flakes. The flakes were then added to an aqueous bath and a food grade alkaline reagent, calcium hydroxide, was added until a pH of about 10 was reached. The material was extracted for 30 minutes and then centrifuged to clarify the extract. The protein material was precipitated from the clarified liquor by adding phosphoric acid until the isoelectric point was reached at a pH of about 4.7. The precipitate was washed with water and centrifuged to concentrate it. This protein isolate or "curd" had a solids content of about 30 percent and a protein purity of about 96 percent on a solids basis. The protein curd while wet was slurried, or stirred, followed by the addition of 2.5 percent fat by weight of the curd, and 1 percent by weight of the curd of sodium chloride. The slurry of the proteinaceous curd was then homogenized and deaerated by placing the slurry in a flat pan or dish and placing the dish in a desiccator which in turn was subjected to a vacuum. The slurry was subjected to the vacuum until, in general, bubbling of air from the slurry stopped. Following homogenization and deaeration of the slurry of the proteinaceous material, about 425 gm. portions of the were was poured into two different containers constructed of metal. Container 1 was a rectangular-shaped container with dimensions of about 6 × 6 inches. Container 2 was a hemispherical container with a radius of about 1⅝ inches. Rectangular container 1 was insulated on three sides by placing on these three sides a one inch layer of Styrofoam. One lengthwise side of the rectangular container was left uninsulated. With hemispherical container 2, the flat or straight portion of the hemisphere was insulated by a one inch layer of Styrofoam while the curved side of the hemisphere was left uninsulated. Both containers with the proteinaceous slurry therein were frozen at −10° F. for 17 hours. Following freezing of the insulated slurry, the insulation layers were removed and while the proteinaceous material was frozen, it was placed in a Dutch oven and cooked at 212°F. for 95 minutes. At the end of this cooking time, the proteinaceous masses were removed from all containers and examined. FIG. 1 is a photographic reproduction of the product obtained by the use of rectangular container 1, and FIG. 2 is a photographic reproduction of the product obtained by the use of hemispherical container 2. It may be seen that the proteinaceous product as illustrated in FIG. 1 resembles, with amazing similarity, cooked muscle tissue. It may be seen that the product comprises a series of protein layers, with lines of cleavage between said layers, these lines of cleavage being generally arranged in the same direction, and in the case of FIG. 1, in a direction generally normal to the uninsulated surface or the bottom edge of the mass which was the area of heat exchange upon engagement of the confined slurry with a refrigerating medium. These lines of cleavage were of course formerly occupied during freezing by ice crystal layers which molded and directionalized the proteinaceous layers into a series of striated protein layers. The product, upon close examination, not only appeared very similar to cooked muscle tissue, but upon being cut with a knife, had the feel and texture of real muscle tissue including the degree of resistance of the proteinaceous mass to cutting by the knife.

The proteinaceous product as removed from the hemispherical container was examined and it also had appeared to be amazingly similar to a piece of cooked muscle tissue. It may be seen that in FIG. 2, the product comprises a series of protein layers, with lines of cleavage between said layers and with these lines of cleavage being generally arranged in the same direction, at least in local zones. In FIG. 2, the lines of cleavage extend in directions generally normal to the uninsulated or curved portion of the hemispherical container which was the area of heat exchange upon engagement of the slurry with the refrigerating medium. The lines of cleavage between the striated protein layers were formerly occupied by ice crystal layers which molded and directionalized the proteinaceous layers into a series of straited protein layers. Upon cutting of the mass with a knife and feeling the product, it was remarkably similar to a piece of cooked muscle tissue.

EXAMPLE 2

1800 gm. of the proteinaceous curd as isolated in Example 1 was reduced to about 25 percent solids by the addition of water, and, after the addition of about 1 percent sodium chloride by weight and about 4 percent fat by weight was formed into a slurry by homogenization thereof. The proteinaceous slurry was also deaerated as set forth in Example 1, and then was subdivided and poured into 5 cylindrical containers having dimensions of about 4 inches high and 4 inches in diameter. The containers were closed on one end and insulated with about a one inch layer of Styrofoam on the closed end and the curved surface. The other end was left uninsulated. These containers with the proteinaceous slurries therein were then frozen at −10° F. for 17 hours. Following freezing of the insulated slurries, insulation layers were removed and while the proteinaceous material was frozen, a thermocouple was embedded approximately in the center of each slurry to record the temperature of the proteinaceous body. Following this, each frozen slurry was placed in a constant temperature bath to determine the temperature needed to irreversibly set the crystalline molded proteinaceous layers by the thermocouple embedded in the proteinaceous body. Container 1 was placed in the constant temperature bath held at 212° F. and the slurry achieved a temperature of about 180° F. after about 1½ hours. Upon removal of the proteinaceous body from the container, it was examined and it was observed that the product had a definite, striated arrangement of protein layers, was very firm in character, being irreversibly fixed, and had lines of cleavage generally arranged in the same direction. It bore a close resemblance to cooked muscle tissue.

Container 2 was placed in the constant temperature bath held at 200° F. and the slurry achieved a temperature of about 165° F. after about 3¾ hours. Upon removal of the proteinaceous body from the container, it was examined and the product was observed to have a definite striated arrangement of protein layers, and to be firm in character, although not as firm as the product removed from Container 1. The product, however, was irreversibly fixed and had lines of cleavage generally arranged in the same direction. The product had a close resemblance to cooked muscle tissue.

Container 3 was placed in a constant temperature bath held at 190° F., and the slurry reached a temperature of about 150° F. after about 3 hours. Upon removal of the proteinaceous body from the container, it was examined and it was observed that the product had a definite striated arrangement of protein layers, was firm in character, although being less firm than the products removed from Containers 1 and 2. The product was irreversibly fixed, however, and had lines of cleavage generally arranged in the same direction. It bore a close resemblance to cooked muscle tissue.

Container 4 was placed in the constant temperature bath held at 180° F., and the slurry achieved a temperature of about 143° F. after about 4¼ hours. Upon removal of the proteinaceous body from the container, it was examined and while it did have some definite striations of protein layers, it was very mushy, of a weak consistency similar to that of an unset gel. The product was not found to have been substantially irreversibly set at this temperature into a definite striated arrangement of protein layers, although there was some setting of the proteinaceous body.

Container 5 was placed into the constant temperature bath held at 160° F., and the slurry achieved a temperature of about 140°F. after about 3¾ hours. Upon removal of the proteinaceous body from the container, it was examined, and it was observed that while the product had a partially structured appearance, it was extremely weak and mushy and not irreversibly fixed, in fact, part of the proteinaceous body had not even been set up. Thus, at this temperature, the proteinaceous body was observed to not have been substantially irreversibly set into a definite striated arrangement of protein layers to closely resemble cooked muscle tissue in appearance as well as texture.

EXAMPLE 3

A beef chuck roast of about 2½ lb. was prepared by slicing the raw meat away from the bone, removing the majority of the fat, and grinding it in a Hobart meat grinder. The ground meat was then formed into a slurry in a Waring blender by the addition of water until a solids content of about 20 percent was achieved, followed by blending of the slurry until a mixture of uniform consistency was obtained. The beef slurry was then deaerated by pouring it in a dish which was placed in a desiccator which was in turn evacuated. After air had stopped bubbling from the slurry, the slurry was poured into a cylindrical container with dimensions of 4 inches in length and 4 inches in diameter. The container was insulated on one end and on the curved surface with a one inch layer of Styrofoam. One end of the cylindrical container was left uninsulated and the container was then frozen at −20° F. for 17 hours. At the end of that time, the frozen proteinaceous slurry in the insulated container, following removal of the insulation, was placed in a steam chest at 212° F. and cooked for about 2¾ hours. At the end of that time, the proteinaceous product was removed from the container and when examined and sliced with a knife, was observed to have an arrangement of striated protein layers with lines of cleavage generally in the same direction. The product resembled a choice roast such as a sirloin tip or similar type of roast because of the very tender, uniform quality of the striated food product produced from a rather poor quality beef chuck roast. The product when tasted had a definite beef taste and flavor and was very tender when chewed. The striated beef food product had the following analysis:

| | |
|---|---|
| Moisture | 69% |
| Protein | 21.8% |
| Fat | 7.49% |
| Fiber | 2.21% |
| Ash | .66% |
| Salt | .13% |

EXAMPLE 4

Figure 3:
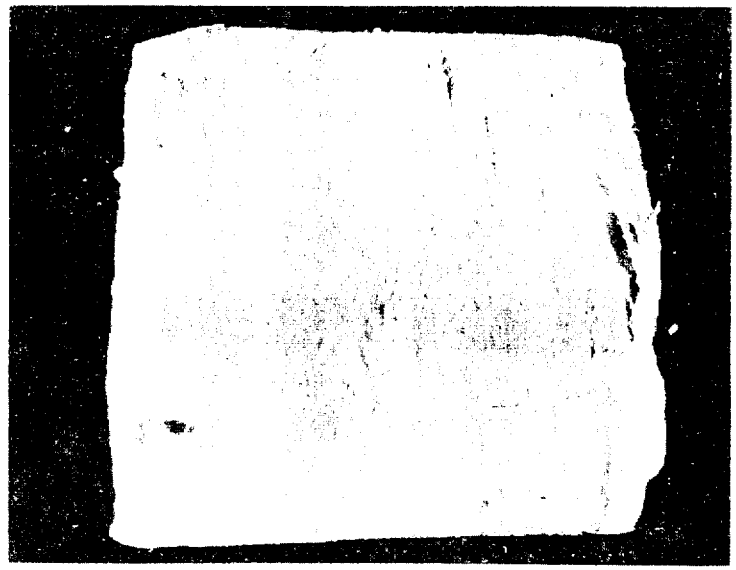
FIG. 3 is a photographic reproduction of a pork product resembling a pork roast made from pork according to this invention.
Figure 4:
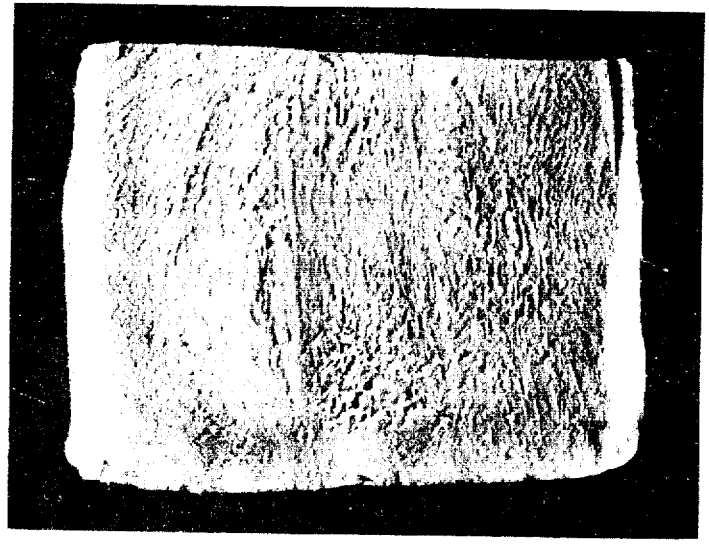
FIG. 4 is a photographic reproduction of a simulated beef roast made from a mixture of equal portions of beef and soy protein according to this invention.

About 2 lb. of a piece of pork was prepared by removing the raw meat away from the bones and grinding it in a Hobart meat grinder. The ground meat was then formed into a slurry in a Waring blender by the addition of water until a solids content of about 20 percent was achieved, followed by blending of the slurry until a relatively smooth and uniform mixture was attained. The pork slurry was thus deaerated by pouring into a dish which was placed in a desiccator which was in turn evacuated. After air had stopped bubbling from the slurry, the slurry was poured into a cylindrical container with dimensions of 4 inches in length and 4 inches in diameter. The container was insulated on one end and on the curved surface with a one inch layer of Styrofoam. One end of the cylindrical container was left uninsulated and the container was then frozen at −20° F. for 17 hours. At the end of that time, the frozen proteinaceous slurry in the insulated container, following removal of the insulation was placed in a steam chest at 212° F. and cooked for about 2¾ hours. At the end of that time, the proteinaceous product was removed from the container and when examined and sliced with a knife, was observed to have a striated arrangement of protein layers with lines of cleavage generally in the same direction. The proteinaceous product after slicing is shown in FIG. 3. The product resembled a pork roast and had a tender, uniform quality with a pork-like taste. The product had the appearance of a choice piece of pork roast and was likewise very tender when chewed.

EXAMPLE 5

Broiler thighs and breasts were deboned and skinned. The meat portions were ground in a Hobart meat grinder. About 2,000 grams of this meat was then mixed with about 1500 ml. of water until a solids content of about 15 percent was achieved; the mixture was then slurried by grinding through a colloid mill. The proteinaceous slurry was then subdivided into six 200 gram portions and to each portion, the following amounts of fat or sodium chloride was added and mixed therewith.

|  | Protein slurry (g) | Fat (g) | Salt (g) |
|---|---|---|---|
| Portion A | 200 | 0 | 0 |
| Portion B | 190 | 10 | 0 |
| Portion C | 200 | 0 | 1 |
| Portion D | 200 | 0 | 2 |
| Portion E | 200 | 0 | 4 |
| Portion F | 180 | 20 | 2 |

Figure 5:
FIG. 5 is a photographic reproduction of simulated chicken breast meat made from chicken according to the present invention.

Each portion was then deaerated by placing in a dish which was in turn placed in a desiccator which was evacuated. Deaeration continued until the slurry stopped bubbling. The slurry was then poured into cylindrically shaped molds having dimensions of 4 inches long × 4 inches in diameter. One end and the curved surface were insulated with a one inch layer of Styrofoam. Each was frozen at 0° F. for 17 hours, followed by removal of the insulation and cooking of each container with the frozen slurry therein in a steam chest held at 212° F. for a period of about 2½ hours. After cooking, each portion was removed from the container and examined by slicing with a knife and then examining the product by tearing, chewing and tasting. All portions were observed to have a definite arrangement of striated protein layers, with lines of cleavage generally in the same direction. The proteinaceous product after slicing is shown in FIG. 5 and resembled white chicken breast meat in appearance, texture and taste. Any percentage of dark meat which had been removed from the chickens was not apparent in the product. The products produced in Portions B and F were observed to be exceptionally tender in quality although all portions had a definite arrangement of striated protein layers with lines of cleavage generally arranged in the same direction and normal to the uninsulated surface of the container.

EXAMPLE 6

To 1650 grams of boneless raw chicken meat was added about 1000 grams of water, which was ground through a colloid mill to a uniform and generally homogeneous slurry. To about 250 grams of this homogeneous proteinaceous slurry was added 250 grams of the proteinaceous curd or isolate as derived from a vegetable protein source in Example 1 and the final proteinaceous slurry, after addition of the vegetable protein had a solids content of about 20 percent. After addition of the curd, the mixture was blended followed by placing of the mixture in a dish, then placing in an evacuated desiccator to deaerate the slurry. This slurry was then placed in a cylindrical mold having a length of 4 inches and a diameter of 4 inches which was insulated on one end and on the curved surface with a one inch layer of Styrofoam. One of the container was left uninsulated and the container was frozen at 0° F. for 17 hours. At the end of that time, the frozen proteinaceous slurry in the insulated container, following removal of the insulation, was placed in a steam chest at 212° F. and cooked for about 2 hours. At the end of that time, the proteinaceous product was removed from the container and examined by slicing with a knife. It was observed to have a definite arrangement of striated protein layers with lines of cleavage, generally in the same direction and normal to the uninsulated surface, at least in local zones of the product. The product sliced and resembled closely in tenderness and texture, chicken breast meat. It was observed to be somewhat darker than the striated food product made in Example 5 which utilized only chicken meat as the protein source.

EXAMPLE 7

About 40 lb. of Turkeys were deboned and the meat from the breasts, thighs and backs was used in addition to the skin. Water was added to the turkey meat in an amount of about 50 percent by weight and ground into a uniform appearing, homogeneous slurry. A 395 gram portion of the Turkey slurry was reduced to a solids content of about 20 percent by the addition of 100 grams water. 5 grams by weight of sodium chloride was also added to the mixture. The slurry was then deaerated by pouring into a dish which was placed in a desiccator which was evacuated. After air had stopped bubbling from the slurry, the daerated slurry was poured into a cylindrically shaped container with dimensions of 4 inches in length and 4 inches in diameter. The container was insulated on one end and on the curved surface with a one inch layer of Styrofoam, one end of the cylindrical container was left uninsulated and the container was then frozen at 0° F. for 17 hours. At the end of that time, the frozen proteinaceous slurry in the insulated container, following removal of the insulation, was placed in a steam chest at 212° F. and cooked for about 2 hours. At the end of that time, the proteinaceous product was removed and examined. Upon slicing with a knife, it was observed to have an arrangement of striated protein layers, with generally unidirectional lines of cleavage, also generally normal to the uninsulated end of the container, at least in local zones. The product appeared, felt and tasted like a tender piece of turkey breast meat and was very light in color.

EXAMPLE 8

A 250 gram portion of the homogenized proteinaceous slurry made from Turkeys in Example 6 is blended with a 250 gram portion of the curd or isolate derived from vegetable protein in Example 1. To this is added 1.25 grams of sodium chloride and the mixture is thoroughly mixed or blended. The slurry with a solids content of about 27 percent is then deaerated by pouring into a dish and placing in an evacuated desiccator until the slurry stops bubbling. The deaerated slurry is poured into a cylindrically shaped container with dimensions of 4 inches in length and 4 inches in diameter. The container was insulated on one end and on the curved surface with a one inch layer of Styrofoam. One end of the cylindrical container was left uninsulated and the container was then frozen at 0° F. for 17 hours. At the end of that time, the frozen, proteinaceous slurry in the insulated container, following removal of the insulation, was placed in a steam chest at 212° F. and cooked for about 2¾ hours. At the end of that time, the proteinaceous product was removed from the container, sliced and examined. It was also observed to have an arrangement of striated protein layers with lines of cleavage, generally in the same direction and normal to the uninsulated surface, at least in local zones. The product had the appearance or texture of chicken or turkey and was very tender when sliced with a knife.

EXAMPLE 9

30 grams of isolated cotton seed protein material having a protein content of 91 percent on a dry solids basis was slurried with 150 grams of water. To this mixture was added 0.75 percent by weight of calcium chloride, and the pH of the mixture was 6.0. The slurry had a solids content of about 20 percent. The slurry was then homogenized and deaerated by placing the slurry in a flat pan or dish and placing the dish in a desiccator, which in turn was subjected to a vacuum. The slurry was subjected to the vacuum until, in general, bubbling of air from the slurry stopped. Following homogenization and deaeration of the slurry of the proteinaceous material, the slurry was poured into a rectangular shaped aluminum pan with dimensions of about 6 × 6 inches. This container with the proteinaceous slurry therein was then frozen at 0° F. for 17 hours. Following freezing of the slurry, the frozen proteinaceous material in the pan was placed in a steam chest at 212° F. for about two hours and cooked. Upon removal of the proteinaceous body from the container, it was examined after slicing, and it was observed that the product had a definite striated arrangement of protein layers, was very firm in character, and had lines of cleavage which were generally arranged in directions normal to the surfaces of the pans, at least in local zones.

EXAMPLE 10

3.9 pounds of hexane extracted sunflower seed meal was slurried with 39 pounds of water. The pH of the slurry was adjusted to about 10.5 with the use of calcium hydroxide. The material was extracted for 30 minutes, followed by centrifugation of the material to clarify the extract. The protein material was precipitated from the clarified liquor by adding hydrochloric acid until the pH was lowered to about 5.0. The precipitated protein was washed with water and centrifuged to concentrate it. This protein isolate had a protein purity of about 75 percent on a dry solids basis. 132 grams of the concentrated sunflower protein material was slurried to achieve a solids content of about 19 percent, followed by the addition of 1 gram of sodium chloride, and adjustment of the pH of 5.5 with hydrochloric acid. This slurry was then homogenized, followed by deaeration by placing the slurry in a dish and placing the dish in a desiccator, which in turn was subjected to a vacuum. The slurry was subjected to a vacuum until, in general, bubbling of air from the slurry stopped. Following homogenization and deaeration, the slurry was poured into a cylindrically shaped glass container having dimensions of about 4 inches high and 4 inches in diameter. The container was closed on one end and insulated with about a one inch layer of Styrofoam on the closed end and curved surface. The other end was left uninsulated. This container with the slurry therein was frozen at 0° F. for 17 hours. Following freezing of the insulated slurry, the insulation layers were removed and the frozen material in the container was placed in a steam chest held at a temperature of 212° F. for about two hours. Upon removal of the proteinaceous body from the container, it was sliced and examined, and the product had a definite striated arrangement of protein layers and bore a close resemblance to cooked muscle tissue.

EXAMPLE 11

Three 600 gram portions of the proteinaceous curd as isolated in Example 1 was adjusted to a solids content of about 27 percent by weight, followed by the addition of 1 percent sodium chloride by weight and about 2½ percent fat by weight. Each portion of the curd was formed into a separate slurry by homogenization thereof. Each proteinaceous slurry was also deaerated by placing in a flat dish, which was subjected to a vacuum until the air stopped bubbling from the slurry. Thereafter, each proteinaceous slurry was poured into three separate cylindrical containers with dimensions about 4 inches high and 4 inches in diameter. The containers were closed on one end and insulated with about a one inch layer of Styrofoam on the closed end and on the curved surface. The other end was left uninsulated. Thereafter the containers were designated as containers A, B, and C and treated individually as follows:

Container A was frozen in a freezer at a temperature of −120° F. with thermocouples being embedded at various depths within the slurry to record the temperature change. At this freezer temperature, the embedded thermocouples indicated that the slurry went through the freezing point range or the temperature range of 32° − 27° F. as measured at any point within the slurry, in a period of time between about 4 minutes to about 9 minutes. Following the complete freezing of the proteinaceous mass, the insulation was removed and the frozen slurry was placed in a stream chest at 212° F. and cooked for about 2 hours. At the end of this time, the sample was removed and sliced and was observed to have a striated arrangement of protein layers, the striations being very uniform in nature and the product resembled cooked muscle tissue in appearance.

Container B was frozen by immersing the container in a liquid fluorocarbon bath at a temperature of about −22° F. with thermocouples being embedded at various depths in the slurry to record the temperature change. At this temperature and by immersing the container with the slurry therein to a depth of about 2 inches, the embedded thermocouples indicated that the slurry went through the freezing point range, or the temperature range, of 32° − 27° F. as measured at any point within the slurry in a period of time between about 4 minutes to about 12 minutes. Following freezing of the proteinaceous mass, the insulation was removed and the frozen slurry was placed in a steam chest at 212° F. and cooked for about two hours. At the end of this time, the sample was removed and sliced and was observed to have a straited arrangement of protein layers, the stria being very uniform in nature, generally arranged in the same direction, and the product resembled cooked muscle tissue in appearance.

Container C was frozen by immersing the container with the slurry therein in a liquid nitrogen bath, the bath being at about −320° F. Thermocouples were embedded at various depths within the slurry to record the temperature change. By immersing the container with the slurry therein in the liquid nitrogen bath to a depth of about one inch, the embedded thermocouples indicated that the slurry went through the freezing point range, or the temperature range, of 32° − 27° F. as measured at any point within the slurry in a period of time of about one minute. Following complete freezing of the proteinaceous mass, the insulation was removed and the frozen slurry was placed in a steam chest at 212° F. and cooked for about two hours. At the end of this time, the sample was removed and sliced and was observed to have a striated arrangement of protein layers, the stria being uniform from the top to the bottom of the proteinaceous mass, and the product closely resembled cooked muscle tissue in appearance.

In view of the basic significance of this invention and the breakthrough it creates in the structuring of protein food products, it is considered that the invention is not to be specifically limited to the disclosure details, but is to be defined by the scope of the appended claims and all reasonable equivalents.

We claim:

1. A method of preparing a structured protein food product having an arrangement of striated protein layers comprising the steps of:
   a. freezing an aqueous slurry of a protein material having a solids content of at least about 5 percent by weight, to form ice crystal layers in said slurry thereby compressing and molding the protein material of the slurry into layers, and
   b. heat setting the protein layers into an irreversible, substantially insoluble form by heating the frozen slurry to a temperature sufficiently high to allow the protein layers to irreversibly set and lower than a temperature at which the protein will degrade, thereby melting the ice crystal layers to form the structured protein food product.

2. A method of preparing a structured protein food product having an arrangement of striated protein layers comprising the steps of;
   a. freezing an aqueous slurry of a protein material having a solids content of at least about 5 percent by weight by contacting at least part of the surface area of said slurry with a refrigerating medium to form directionally aligned ice crystal layers in said slurry which extend in a direction generally normal to said contacted surface area part, thereby compressing and molding the protein material of the slurry into layers, and
   b. heat setting the protein layers into an irreversible, substantially insoluble form by heating the frozen slurry to a temperature sufficiently high to allow the protein layers to irreversibly set and lower than a temperature at which the protein will degrade, thereby melting the ice crystal layers to produce the structured protein food product.

3. The method of claim 2 wherein said protein material is an animal protein material.

4. The method of claim 2 wherein said protein material is a secondary protein source.

5. The method of claim 4 wherein said secondary protein source is a vegetable protein material.

6. The method of claim 5 wherein said vegetable protein material is a soybean material.

7. The method of claim 2 wherein said protein material is a mixture of an animal protein material and a secondary protein source.

8. The method of claim 2 wherein said slurry is heat set at a temperature of at least about 150°F.

9. The method of claim 2 wherein more than one part of the surface area of said slurry is contacted with a refrigerating medium to freeze the slurry and form directionally aligned ice crystal layers in said slurry which extend in a direction generally normal to each contacted surface area part, thereby compressing and molding the protein material into layers.

10. A method of preparing a structured protein food product having an arrangement of straited protein layers comprising the steps of;
    a. freezing an aqueous slurry of a protein material having a solids content of at least about 5 percent by weight, by contacting at least part of the surface area of said slurry with a refrigerating medium to reduce the slurry temperature through the freezing point range of said slurry in not less than about 5 minutes and form directional aligned ice crystal layers in said slurry which extend in a direction generally normal to the contacted surface area part, thereby compressing and molding the protein material of the slurry into layers, and
    b. heat setting the protein layers into an irreversible, substantially insoluble form, by heating the frozen slurry to a temperature sufficiently high to allow the protein layers to irreversibly set, and lower than a temperature at which the protein will degrade, thereby melting the ice crystal layers to produce a structured protein food product.

11. The method of claim 10 wherein said protein material is a secondary protein source.

12. The method of claim 11 wherein said secondary protein source is a vegetable protein material.

13. The method of claim 12 wherein said vegetable protein material is a soybean material.

14. The method of claim 10 wherein said slurry has a protein content of at least about 15 percent by weight.

15. The method of claim 10 wherein said slurry has a solids content of at least about 15 percent by weight.

16. The method of preparing a structured protein food product having an arrangement of striated protein layers comprising the steps of;
    a. freezing an aqueous slurry of a protein material having a solids content of at least about 5 percent by weight, by contacting at least part of the surface area of said slurry with a refrigerating medium to reduce the slurry temperature through a freezing point range of between about 32° to 27°F. in not less than about 5 minutes and form directionally aligned ice crystal layers in said slurry which extend in a direction generally normal to the contacted surface area part, thereby compressing and molding the protein material of the slurry into layers, and
    b. heat setting the protein layers into an irreversible, substantially insoluble form by heating the frozen slurry to a temperature sufficiently high to allow the protein layers to irreversibly set, and lower than a temperature at which the protein will degrade, thereby melting the ice crystal layers to produce the structured protein food product.

17. The method of claim 16 wherein said slurry is heat set at a temperature of at least about 150°F.

18. A structured protein food product comprising an arrangement of striated protein layers, said layers having lines of cleavage generally arranged in the same direction, said layers being composed of irreversibly heat set, substantially insoluble, protein particles, and having been arranged in striated fashion by ice crystal layers.

19. The product of claim 18 wherein said protein material is a secondary protein source.

20. The product of claim 19 wherein said secondary protein source is a vegetable protein material.

21. The product of claim 20 wherein the vegetable protein material is an oilseed material.

22. The product of claim 21 wherein the oilseed material is a soybean material.

23. The product of claim 22 wherein said protein food product has a moisture content of at least about 60 percent by weight.

24. The product of claim 22 wherein said food product has a salt content of less than about 3 percent by weight.

25. The product of claim 18 wherein said protein particles comprise a mixture of an animal protein material and a secondary protein source.

26. A structured protein food product resembling cooked muscle tissue in appearance and texture comprising an arrangement of striated protein layers, said layers having lines of cleavage generally arranged in the same direction, said layers being composed of irreversibly heat set, substantially insoluble animal protein particles and having been arranged in striated fashion by ice crystal layers.

* * * * *

UNITED STATES PATENT AND TRADEMARK OFFICE
CERTIFICATE OF CORRECTION

PATENT NO. : 3,920,853
DATED : November 18, 1975
INVENTOR(S) : John E. Middendorf et al It is certified that error appears in the above-identified patent and that said Letters Patent are hereby corrected as shown below:

Column 4, line 10, delete "protein" (second occurrence) and insert --It-- prior to "should"

Column 5, line 11, after "contribute" and prior to "textural" insert --to the-- and after "textural" delete "the tectural"
   line 46, "griding" should read --grinding--

Column 9, line 8, after "quality" and prior to "of" insert --piece--
   line 47, after "the" and prior to "were" insert --slurry--
   line 47, after "were" and prior to "poured" delete "was"

Column 10, line 35, "straited" should read --striated--

Column 13, line 55, after "One" and prior to "of" insert --end--

Column 17, line 63, "straited" should read --striated--

Signed and Sealed this sixth Day of April 1976

[SEAL]

Attest:

RUTH C. MASON
Attesting Officer

C. MARSHALL DANN
Commissioner of Patents and Trademarks